US006884376B2

(12) United States Patent
Chen et al.

(10) Patent No.: US 6,884,376 B2
(45) Date of Patent: Apr. 26, 2005

(54) METHOD FOR MAKING A SHOE SOLE WITH DIFFERENT RESILIENT AREAS

(75) Inventors: Ching-Chin Chen, Fl. 17-2, No. 60-2, Gungye 1st Rd., Taichung (TW); Shih-Kan Liang, No. 4, Alley 4, Lane 62, Jifeng W. Rd., Wufeng Shiang, Taichung (TW)

(73) Assignees: Ching-Chin Chen, Taichung (TW); Shih-Kan Liang, Taichung (TW); Chun Heir Industry Co., Ltd., Taichung (TW)

( * ) Notice: Subject to any disclaimer, the term of this patent is extended or adjusted under 35 U.S.C. 154(b) by 117 days.

(21) Appl. No.: 10/347,343

(22) Filed: Jan. 21, 2003

(65) Prior Publication Data

US 2004/0140580 A1 Jul. 22, 2004

(51) Int. Cl.[7] .............................................. B29C 44/04
(52) U.S. Cl. ...................... 264/45.4; 222/478; 264/45.1
(58) Field of Search ............................... 264/45.1, 45.4; 222/478

(56) References Cited

U.S. PATENT DOCUMENTS

| 5,141,578 | A | * | 8/1992 | Yang | 156/79 |
| 5,308,420 | A | * | 5/1994 | Yang | 156/79 |
| 5,318,645 | A | * | 6/1994 | Yang | 156/79 |
| 6,319,441 | B1 | * | 11/2001 | Yates | 264/113 |
| 6,451,865 | B1 | * | 9/2002 | Migchels et al. | 521/54 |

* cited by examiner

Primary Examiner—Allan R. Kuhns
(74) Attorney, Agent, or Firm—Rosenberg, Klein & Lee

(57) ABSTRACT

A method for making a shoe sole includes step of preparing various types of foamable material; step of making the foamable material into particles; step of preparing a mold having a cavity in which the foamable material is being put; and step of foaming the foamable material in the cavity and obtaining a sole. The foamable material has different resilient coefficients but the same foaming rate so that the sole can be a made by a single foaming process and includes various resilient features.

4 Claims, 7 Drawing Sheets

METHOD FOR MAKING A SHOE SOLE WITH DIFFERENT RESILIENT AREAS

FIELD OF THE INVENTION

The present invention relates to a method for making a shoe sole that includes several area with required resilient features.

BACKGROUND OF THE INVENTION

A conventional method for making a shoe sole is shown in FIGS. 7 and 8, and generally includes a sole 40 which is made by Ethylene Vinyl Acetate, rubber, Thermo-plastic rubber or Polyurethane. The raw material is put in a mold (not shown) to foam to be a sole with a desired shape and desired positions of the sole are provided with concavities 41. Another mold (not shown) is employed to make resilient pads 42 which are made by different type of material and have better resilient or shock absorbing feature. The pads 42 are then glued to the concavities 41. By this method, the sole may have desired features at desired positions. Nevertheless, this method requires two different molds which are costly and the pads 42 could be peeled off from the concavities 41 after a period of use. More labor is required to glue the pads 42 to the sole 40.

The present invention intends to provide a method which makes a shoe sole with different resilient areas in one molding process.

SUMMARY OF THE INVENTION

In accordance with one aspect of the present invention, there is provided a method for making a shoe sole and the method includes the following steps:

step 1: preparing various types of foamable material;

step 2: making the foamable material into particles;

step 3: preparing a mold having a cavity and the foamable material being put in the cavity in pre-determined positions, and step 4: foaming the foamable material in the cavity and obtaining a sole.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
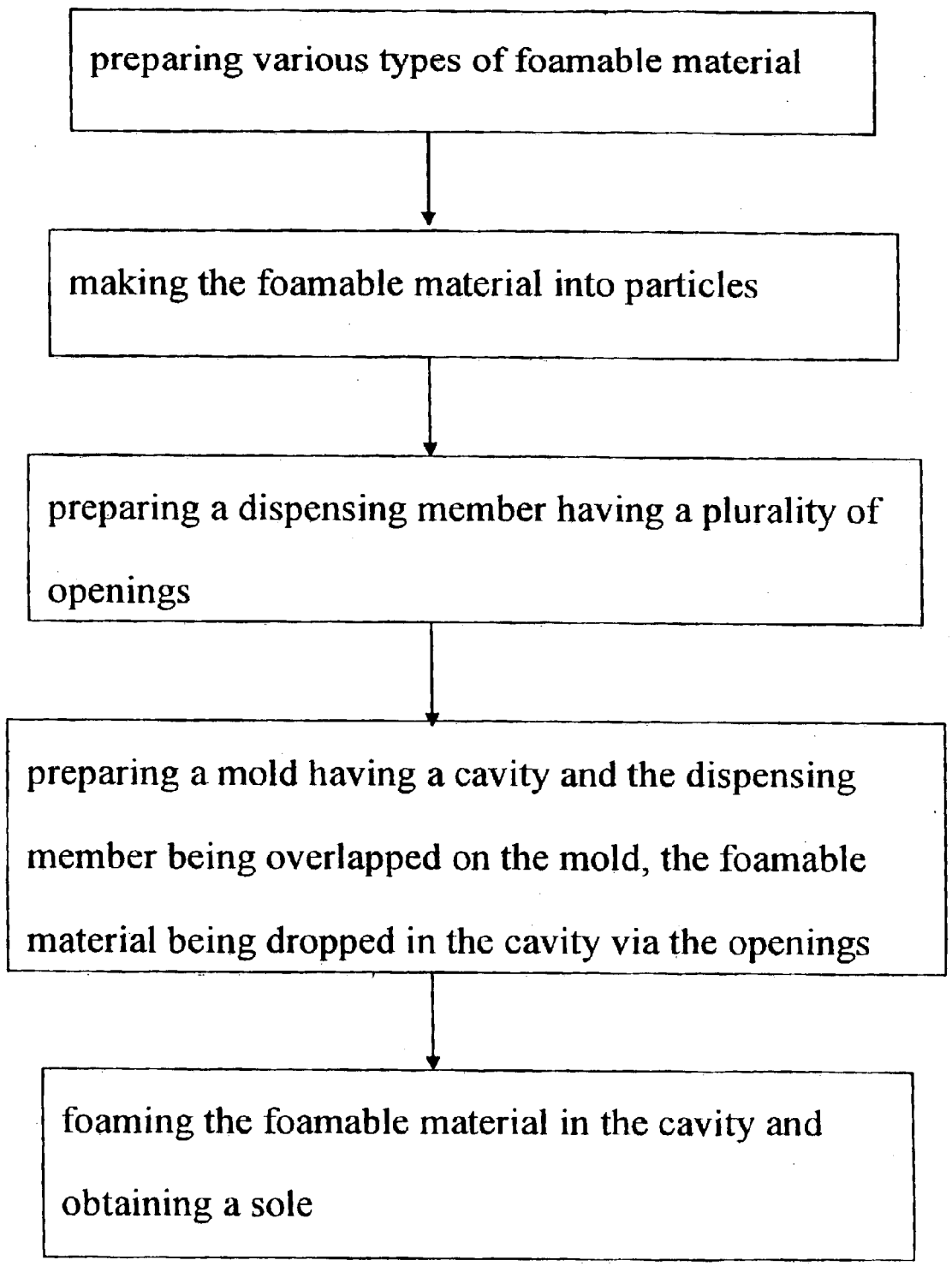
FIG. 1 shows steps of the method of the present invention.
Figure 2:
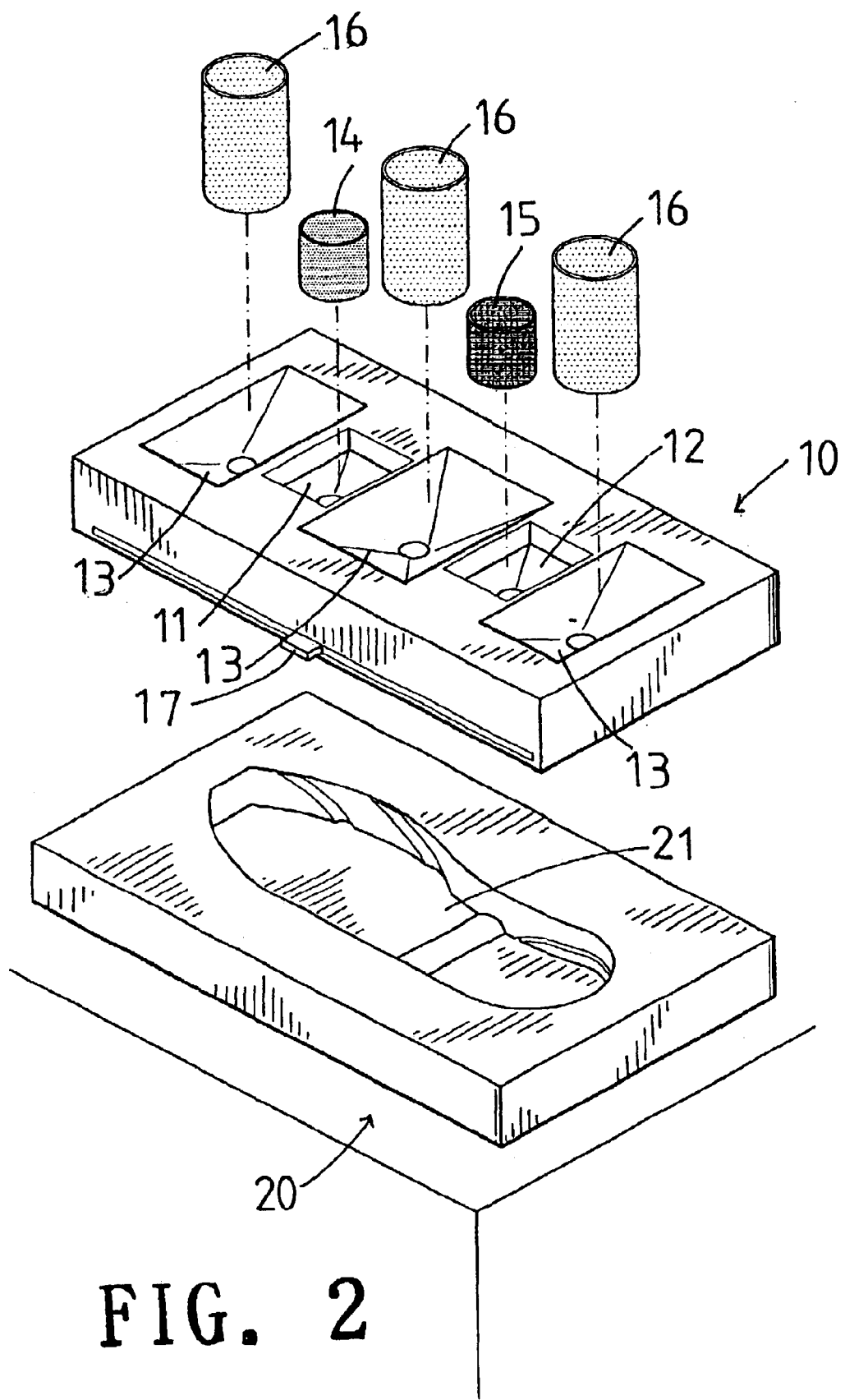
FIG. 2 is an exploded view to show the dispensing member, the mold and the foamable material.
Figure 3:
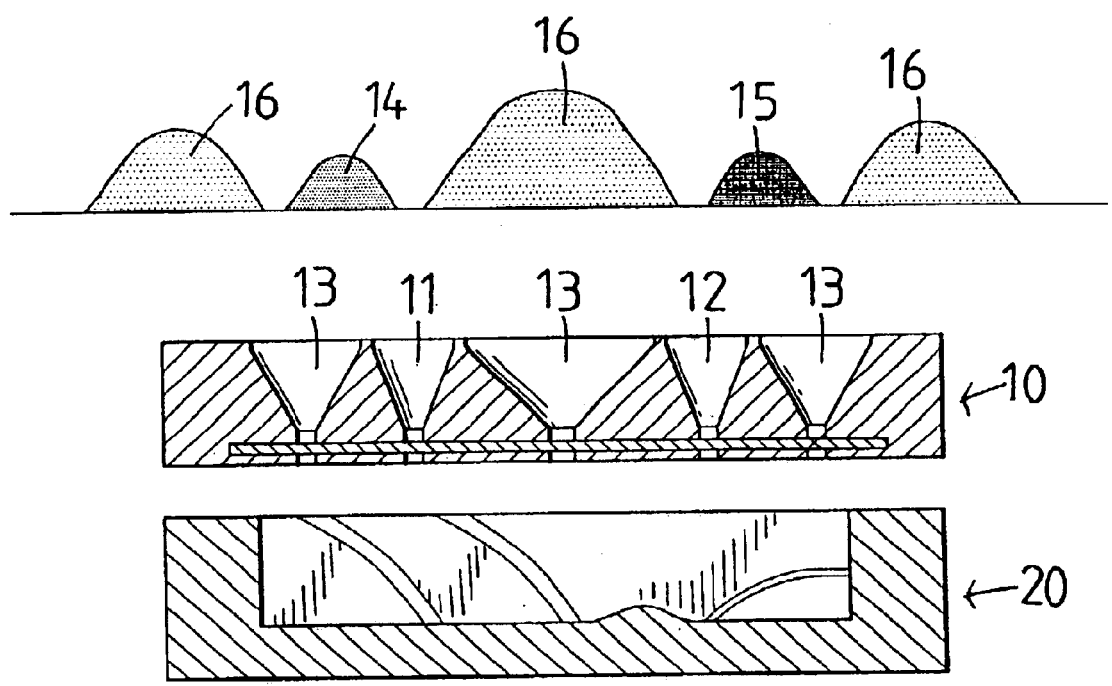
FIG. 3 is a cross sectional view to show the dispensing member, the mold and the foamable material.
Figure 4:
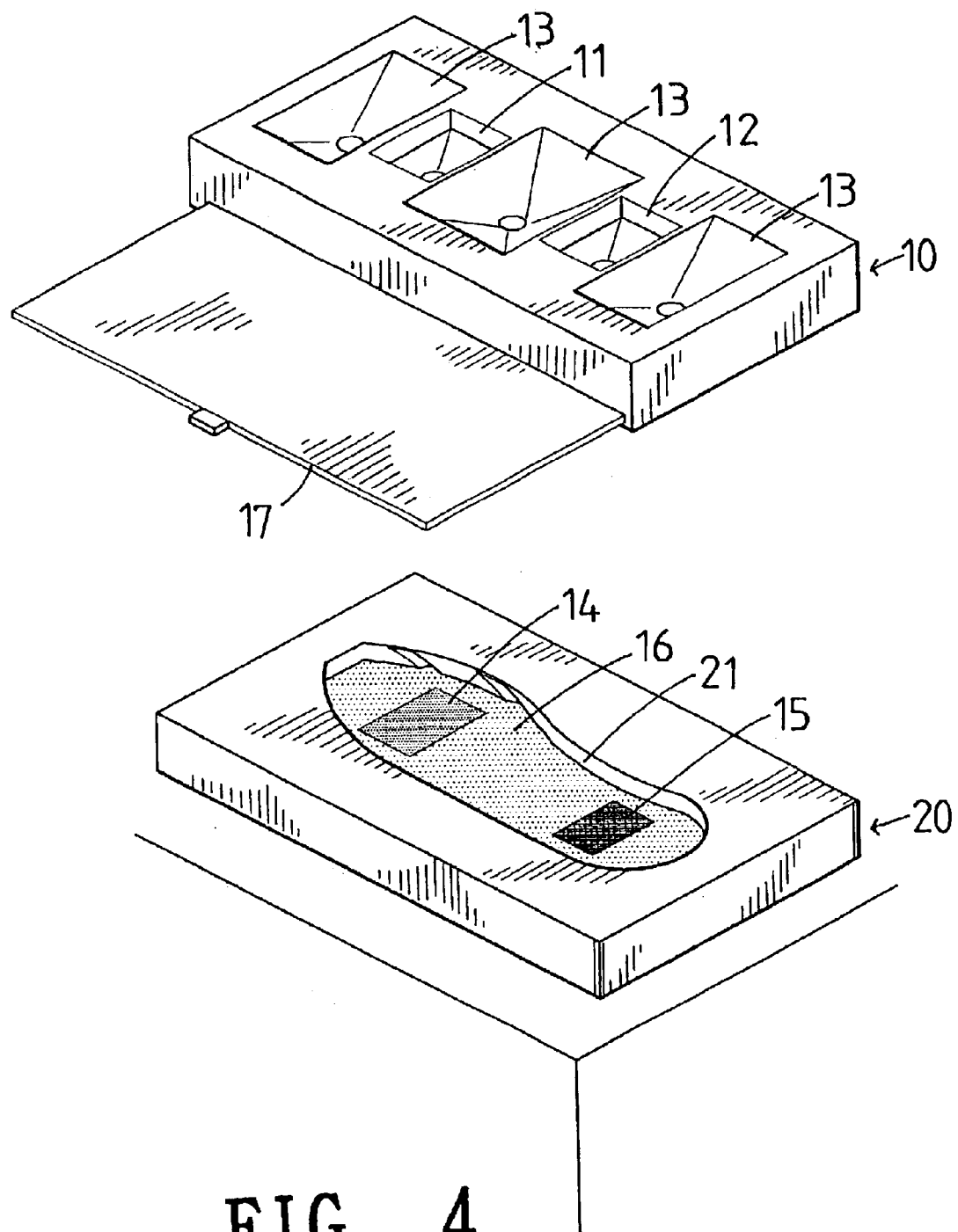
FIG. 4 shows the material in the cavity in the mold.
Figure 5:
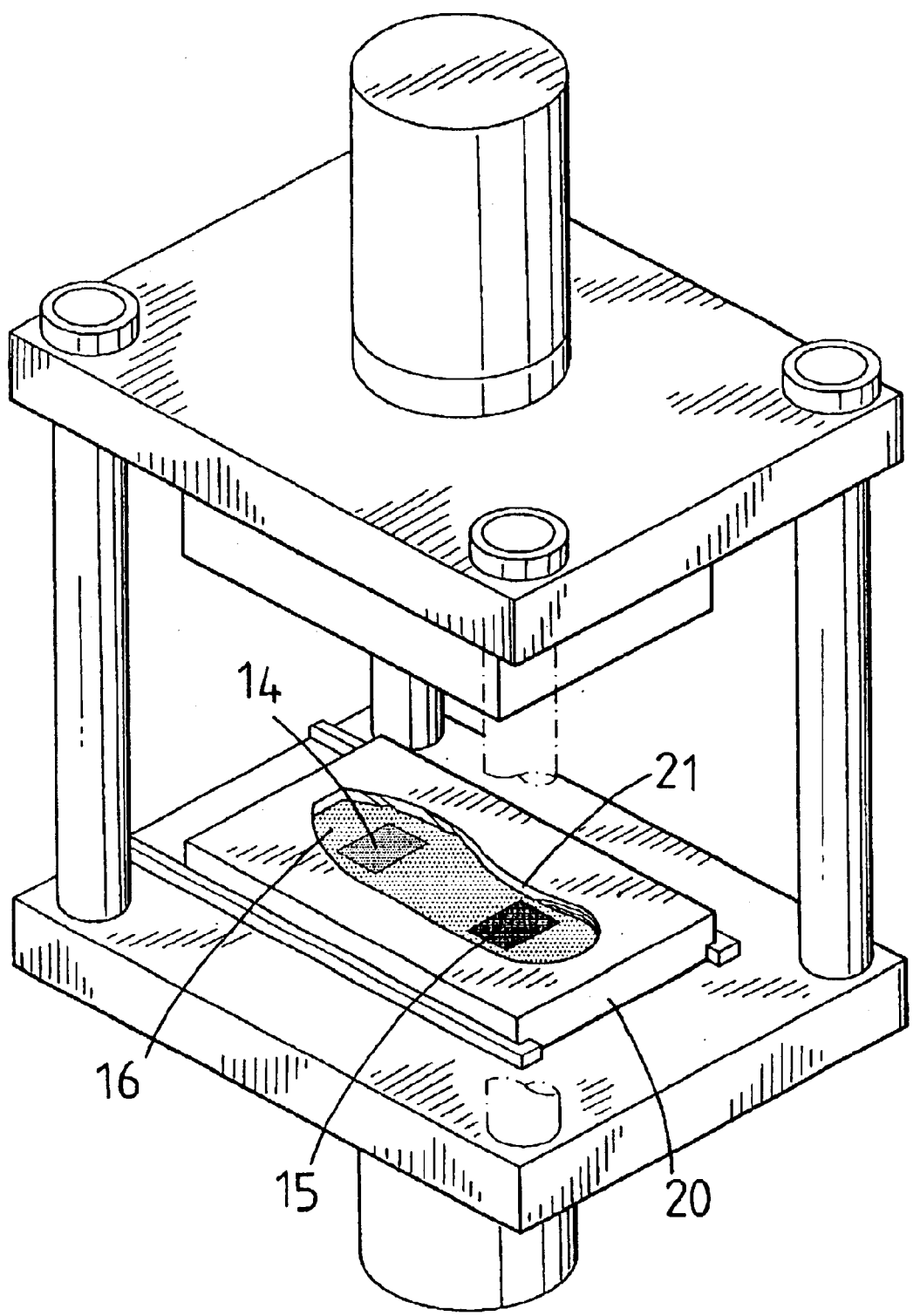
FIG. 5 shows the foamable material treated by a proper machine.
Figure 6:
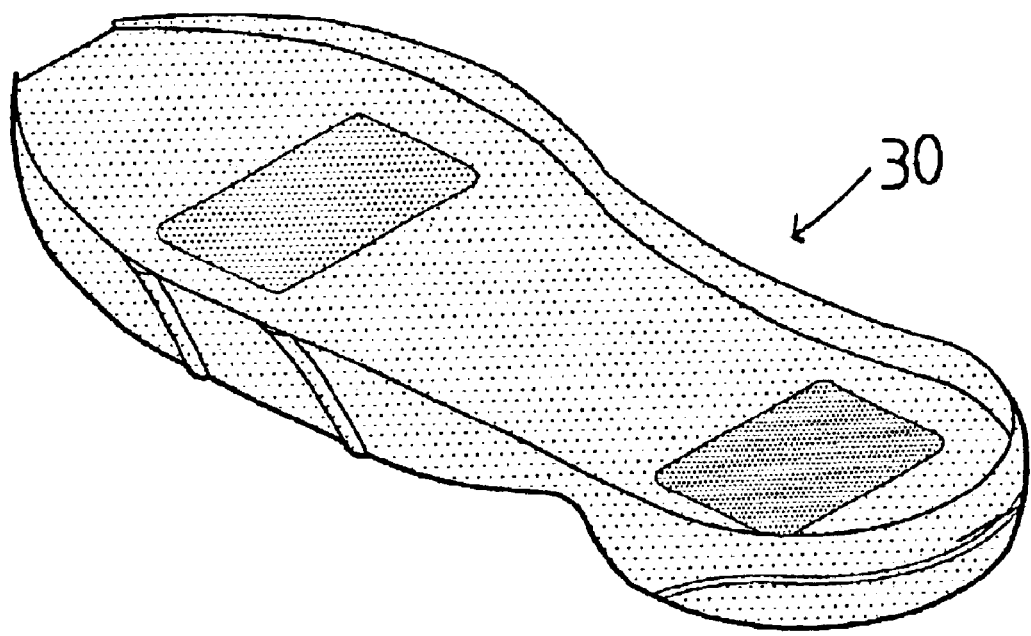
FIG. 6 is a perspective view to show the sole made by the method of the present invention.
Figure 7:
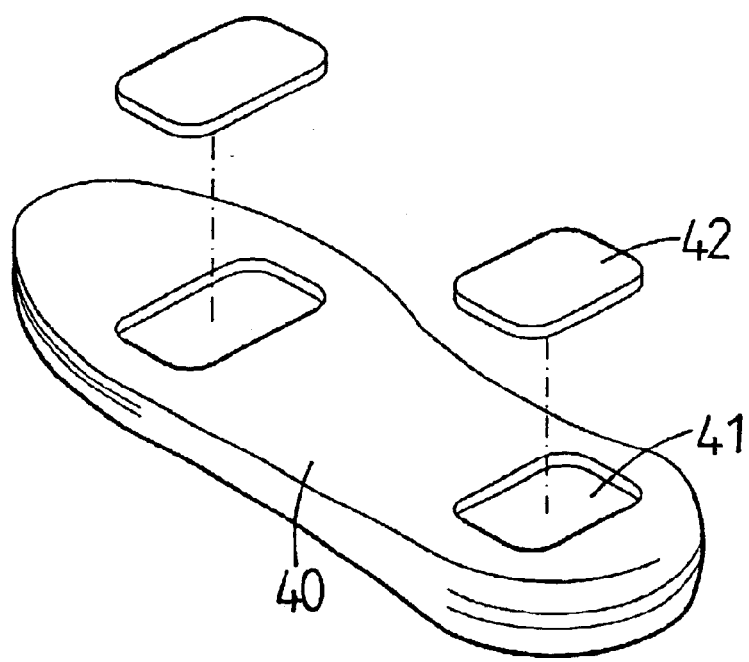
FIG. 7 shows the conventional sole and the resilient pads.
Figure 8:
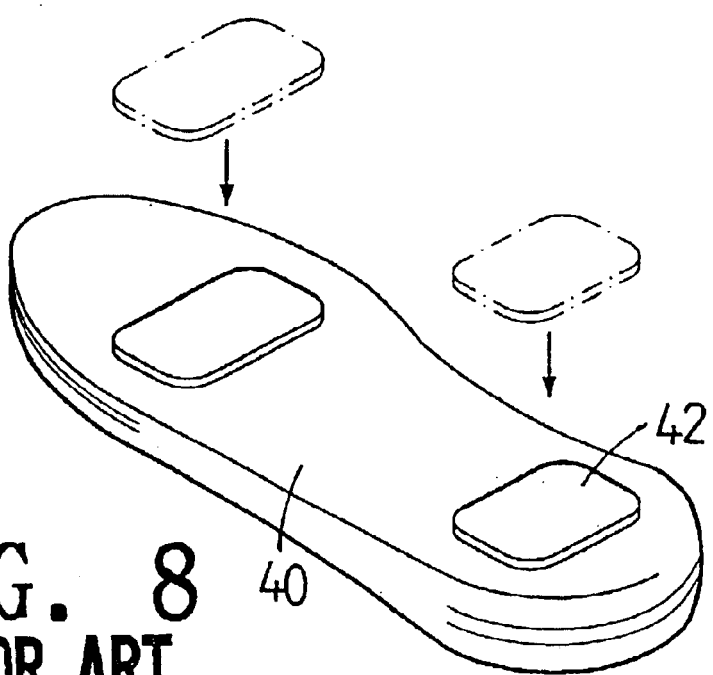
FIG. 8 shows that the resilient pads are glued to the sole.

Referring to FIGS. 1 to 6 the method for making a shoe sole 30 of the present invention comprises the following steps:

step 1: preparing various types of foamable material 14, 15, 16;

step 2: making the foamable material 14, 15, 16 into particles;

step 3: preparing a dispensing member 10 having a plurality of openings 11, 12, and 13, and a board 17 to removably seal the openings in the dispensing member 10;

step 4: preparing a mold 20 having a cavity 21 and the dispensing member 10 being overlapped on the mold 20, the foamable material 14, 15, 16 being dropped in the cavity 21 via the openings 11, 12, 13;

step 5: foaming the foamable material 14, 15, 16 in the cavity 21 and obtaining a sole 30.

The various types of foamable material 14, 15, 16 may have the same foaming rate but individual resilient coefficients. Therefore, the various types of foamable material 14, 15, 16 is positioned at desired positions of the sole 30. All the various types of foamable material 14, 15, 16 are integrally connected to the sole 30 within one foaming process so that the method provides a method that saves a lot of manufacturing time and labor.

The mold 20 may have patterns as needed such that the sole 30 includes desired patterns and/or treads.

While we have shown and described the embodiment in accordance with the present invention, it should be clear to those skilled in the art that further embodiments may be made without departing from the scope of the present invention.

What is claimed is:

1. A method for making a shoe sole, comprising:

step 1: preparing various types of foamable material;

step 2: making the foamable material into particles;

step 3: preparing a dispensing member which has a plurality of openings;

step 4: preparing a mold having a cavity and overlapping the dispensing member on the mold, putting the foamable material in the cavity in pre-determined positions via the openings of the dispensing member, and step 5: foaming the foamable material in the cavity and obtaining a sole.

2. The method as claimed in claim 1, wherein the various types of foamable material have the same foaming rate.

3. The method as claimed in claim 1, wherein the various types of foamable material have individual resilient coefficients.

4. The method as claimed in claim 1 further comprising providing a board which removably seals the openings in the dispensing member.

* * * * *